(12) United States Patent
Kim

(10) Patent No.: US 8,049,700 B2
(45) Date of Patent: Nov. 1, 2011

(54) LIQUID CRYSTAL DISPLAY AND DRIVING METHOD THEREOF

(75) Inventor: Dong-Gyu Kim, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 1264 days.

(21) Appl. No.: 11/517,096

(22) Filed: Sep. 7, 2006

(65) Prior Publication Data

US 2007/0057297 A1    Mar. 15, 2007

(30) Foreign Application Priority Data

Sep. 12, 2005    (KR) .................. 10-2005-0084639

(51) Int. Cl.
*H01L 31/113*    (2006.01)
(52) U.S. Cl. ............... 345/90; 345/92; 349/42; 349/139
(58) Field of Classification Search ............ 345/87–104, 345/694; 349/37–43, 139; 257/291
See application file for complete search history.

(56) References Cited

U.S. PATENT DOCUMENTS 5,576,858 A * 11/1996 Ukai et al. ................ 349/42
2005/0030460 A1 * 2/2005 Kim et al. ................ 349/139

FOREIGN PATENT DOCUMENTS

| CN | 1482505 A | 3/2004 |
|---|---|---|
| JP | 05-173187 A | 7/1993 |
| JP | 05-173188 A | 7/1993 |
| JP | 2004-334061 A | 11/2004 |
| KR | 1020040105934 A | 12/2004 |

* cited by examiner

*Primary Examiner* — Amare Mengistu
*Assistant Examiner* — Jennifer Zubajlo
(74) *Attorney, Agent, or Firm* — Cantor Colburn LLP

(57) ABSTRACT

A liquid crystal display ("LCD") includes a plurality of pixels, each including first and second liquid crystal capacitors, a first storage capacitor including a first terminal connected to the second liquid crystal capacitor and a second terminal applied with a first storage electrode signal, a second storage capacitor including a first terminal connected to the second liquid crystal capacitor and a second terminal applied with a second storage electrode signal having an opposite phase to the first storage electrode signal, and a third storage capacitor including a first terminal connected to the first liquid crystal capacitor and a second terminal applied with the first or second storage electrode signal. A driving method of the LCD improves transmittance and visibility and increases an aperture ratio thereof.

21 Claims, 8 Drawing Sheets

LIQUID CRYSTAL DISPLAY AND DRIVING METHOD THEREOF

This application claims priority to Korean Patent Application No. 10-2005-0084639, filed on Sep. 12, 2005 and all the benefits accruing therefrom under 35 U.S.C. §119, and the contents of which in its entirety are herein incorporated by reference.

BACKGROUND OF THE INVENTION (a) Field of the Invention

The present invention relates to a liquid crystal display ("LCD") and a driving method thereof. More particularly, the present invention relates to an LCD having improved transmittance and visibility and a driving method of the LCD.

(b) Description of the Related Art

A liquid crystal display ("LCD") generally includes an upper panel provided with a common electrode and color filters, a lower panel provided with thin film transistors ("TFTs") and pixel electrodes, and a liquid crystal ("LC") layer interposed there between. The pixel electrodes and the common electrode are supplied with different voltages to generate an electric field in the LC layer that determines orientations of LC molecules within the LC layer. Since the orientations of the LC molecules determine the transmittance of incident light, the LCD can display desired images by adjusting the voltage differences between the pixel electrodes and the common electrode, which are also referred to as "field-generating electrodes".

Among these LCDs, a vertically aligned mode LCD aligns the major axes of the LC molecules vertically with respect to the upper and lower panels in the absence of an electric field, and has a high contrast ratio and wide reference viewing angle. Here, the reference viewing angle is defined as a viewing angle making the contrast ratio equal to 1:10 or as a limit angle for the inversion in luminance between the grays.

The wide viewing angle of the VA mode LCD can be realized by providing cutouts in and protrusions on the field-generating electrodes. Since the cutouts and the protrusions can determine the tilt directions of the LC molecules within the LC layer, the tilt directions can be distributed into several directions by disposing the cutouts and the protrusions in various ways such that the reference viewing angle is widened.

BRIEF SUMMARY OF THE INVENTION

The present invention provides a liquid crystal display ("LCD") and a driving method thereof having advantages of improving the transmittance and visibility as well as increasing the aperture ratio of the LCD.

Exemplary embodiments of the present invention provide an LCD having a plurality of pixels, wherein each of the pixels includes a first and a second liquid crystal capacitor, a first storage capacitor including a first terminal connected to the second liquid crystal capacitor and a second terminal applied with a first storage electrode signal, a second storage capacitor including a first terminal connected to the second liquid crystal capacitor and a second terminal applied with a second storage electrode signal having an opposite phase of a phase of the first storage electrode signal, and a third storage capacitor including a first terminal connected to the first liquid crystal capacitor and a second terminal applied with the first storage electrode signal or the second storage electrode signal.

Here, third storage capacitors in adjacent pixels may be applied with different signals between the first storage electrode signal and the second storage electrode signal.

The LCD may further include a plurality of gate lines transmitting a gate signal and a plurality of data lines transmitting a data voltage, wherein each of the pixels may further include a first switching element connected to a gate line, a data line, a respective first liquid crystal capacitor, and a respective third storage capacitor, and a second switching element connected to the gate line connected to the first switching element, the data line connected to the first switching element, a respective second liquid crystal capacitor, and respective first and second storage capacitors.

The first and second switching elements connected to even-numbered gate lines may be sequentially turned on after the first and second switching elements connected to odd-numbered gate lines are sequentially turned on.

The polarity of the first and second storage electrode signals may be varied after the first and second switching elements connected to the odd gate lines are turned on and before the first and second switching elements connected to the even gate lines are turned on, and the polarity of the first and second storage electrode signals may be varied after the first and second switching elements connected to the even gate lines are turned on and before the first and second switching elements connected to the odd gate lines are turned on.

The LCD may further include a plurality of first storage electrode lines transmitting the first storage electrode signal, a plurality of second storage electrode lines transmitting the second storage electrode signal, a first signal line connecting the plurality of first storage electrode lines, a second signal line connecting the plurality of second storage electrode lines, a plurality of third switching elements connected between the first signal line and the first storage electrode lines and being turned on or off in response to the gate signal, and a plurality of fourth switching elements connected between the second signal line and the second storage electrode lines and being turned on or off in response to the gate signal.

The first and the second liquid crystal capacitors may include first and second sub-pixel electrodes and a common electrode, and each of the first and second sub-pixel electrodes may include at least two parallelogrammic electrode pieces of which inclination directions are different from each other.

An area of the second sub-pixel electrode may be greater than an area of the first sub-pixel electrode.

The second terminal of the third storage capacitor of each alternating pixel may be supplied with the first storage electrode signal and the second terminal of the third storage capacitor of each pixel adjacent to each alternating pixel may be supplied with the second storage electrode signal.

A luminance of a first sub-pixel of each pixel including the third storage capacitor and the first liquid crystal capacitor may be greater than a luminance of a second sub-pixel of each pixel including the first and second storage capacitors and the second liquid crystal capacitor.

Other exemplary embodiments of the present invention provides an LCD including a substrate, a gate line formed on the substrate, a data line intersecting the gate line, a first and a second storage electrode line formed on the substrate, a first and a second thin film transistor ("TFT"), each of which includes a gate electrode connected to the gate line, a source electrode connected to the data line, and a drain electrode, a first sub-pixel electrode connected to the drain electrode of the first TFT, and a second sub-pixel electrode connected to the drain electrode of the second TFT and forming a pixel electrode along with the first sub-pixel electrode. The second sub-pixel electrode or the drain electrode of the first TFT overlaps the first and second storage electrode lines, and the first sub-pixel electrode or the drain electrode of the first TFT overlaps either the first or the second storage electrode line.

Here, phases of signals applied to the first storage electrode line and the second storage electrode line may be opposite to each other.

An area of the first sub-pixel electrode may be smaller than an area of the second sub-pixel electrode.

Each of the first and second sub-pixel electrodes may include at least two parallelogrammic electrode pieces of which inclination directions are different from each other.

The first and second storage electrode lines may be disposed between the first sub-pixel electrode and the second sub-pixel electrode.

The data line may extend in a straight line.

The LCD may further include an organic layer formed between the first and second TFTs, the gate line, and the data line and the pixel electrode.

Other exemplary embodiments of the present invention provides a driving method of an LCD including a plurality of pixels, each of the pixels including a gate line, a data line, a first and a second storage electrode line, a first and a second switching element connected to the gate line and the data line, a first liquid crystal capacitor connected to the first switching element, a second liquid crystal capacitor connected to the second switching element, a first storage capacitor connected to the first switching element and the first or the second storage electrode line, a second storage capacitor connected to the second switching element and the first storage electrode line, and a third storage capacitor connected to the second switching element and the second storage electrode line, wherein the method includes charging the first and second liquid crystal capacitors, and raising or dropping a voltage of the first liquid crystal capacitor by raising a voltage of the first storage electrode line or dropping a voltage of the second storage electrode line.

Here, charging the first and second liquid crystal capacitors may include applying a data voltage to the data line, transmitting the data voltage to the first and second liquid crystal capacitors by applying a first voltage to the gate line to turn on the first and second switching elements, and turning off the first and second switching elements by applying a second voltage to the gate line.

Raising or dropping a voltage of the first liquid crystal capacitor may include applying signals having opposite phases to each other to the first storage electrode line and the second storage electrode line, respectively.

The LCD may include a plurality of first gate lines and a plurality of second gate lines arranged alternately with the first gate lines. Charging the first and second liquid crystal capacitors may include charging the first and second liquid crystal capacitors connected to the first gate lines, and charging first and second liquid crystal capacitors connected to the second gate lines. Raising or dropping a voltage of the first liquid crystal capacitor may include varying voltages of the first storage electrode line and the second storage electrode line after applying a first voltage to the first gate lines and before sequentially applying the first voltage to the second gate lines, and varying voltages of the first storage electrode line and the second storage electrode line after applying the first voltage to the second gate lines.

Raising or dropping a voltage of the first liquid crystal capacitor may include adjusting the voltage of the first liquid crystal capacitor such that a lateral gamma curve of the LCD becomes similar to a frontal gamma curve of the LCD to improve lateral visibility.

BRIEF DESCRIPTION OF THE DRAWINGS

The above and other features and advantages of the present invention will become readily apparent by reference to the following detailed description when considered in conjunction with the accompanying drawings wherein.

DETAILED DESCRIPTION OF THE INVENTION

Figure 1:
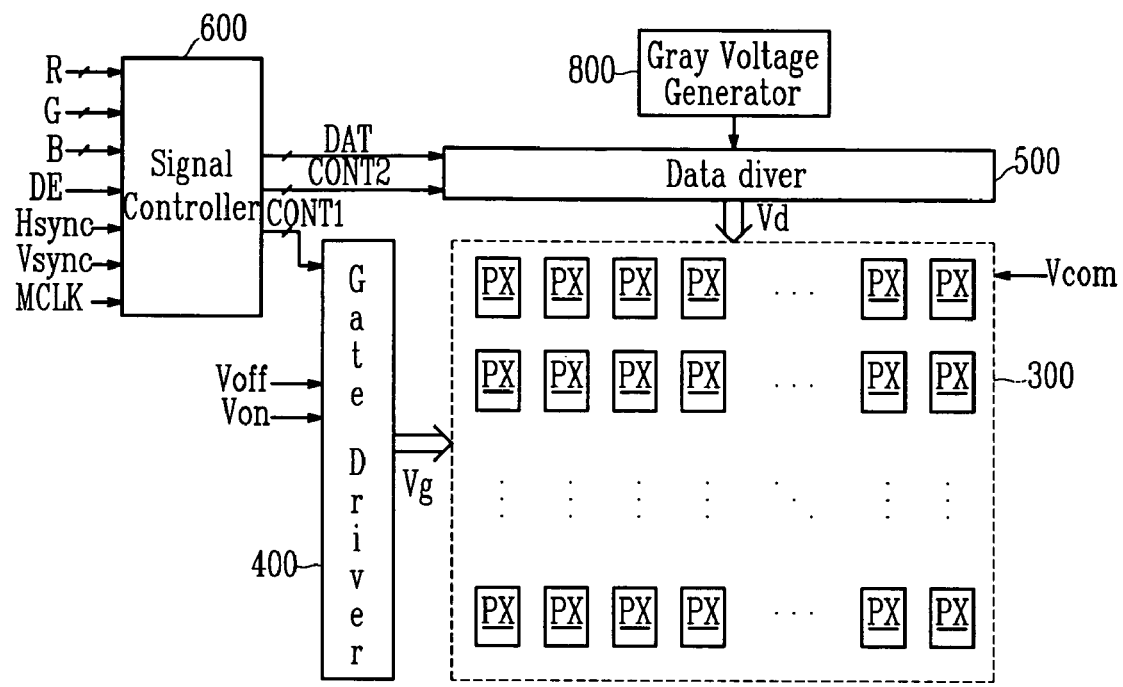
FIG. 1 is a block diagram of an exemplary LCD according to an exemplary embodiment of the present invention.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Although wide viewing angles can be realized by providing cutouts in the pixel electrodes and the common electrode of a liquid crystal display ("LCD"), an increase in the number of cutouts and protrusions reduces the aperture ratio since it is hard for light to transmit where the cutouts or the protrusions are located. In order to increase the aperture ratio, an ultra-high aperture ratio structure, in which the size of the pixel electrodes is increased, has been suggested. However, the aperture ratio is easily decreased, and it is difficult to improve the transmittance even in the ultra-high aperture ratio structure.

Therefore, exemplary embodiments of the present invention improve the transmittance and visibility as well as increase the aperture ratio of an LCD.

First, an LCD according to an exemplary embodiment of the present invention will be described with reference to FIG. 1 and FIG. 2.

Figure 2:
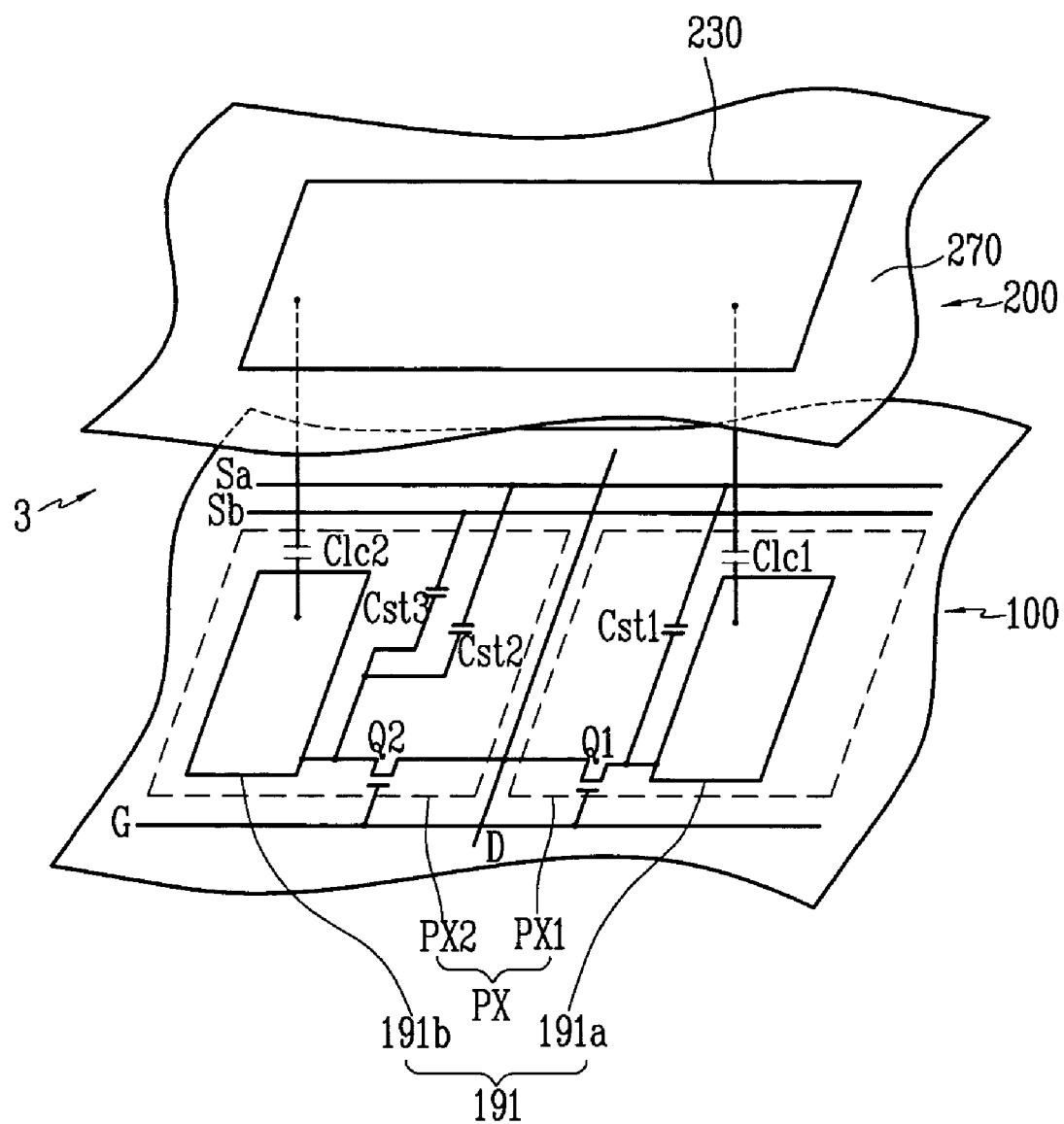
FIG. 2 is an equivalent circuit diagram of an exemplary pixel of an exemplary LCD according to an exemplary embodiment of the present invention.

FIG. 1 is a block diagram of an exemplary LCD according to an exemplary embodiment of the present invention, and FIG. 2 is an equivalent circuit diagram of an exemplary pixel of an exemplary LCD according to an exemplary embodiment of the present invention.

As shown in FIG. 1, an LCD includes a liquid crystal ("LC") panel assembly 300, a gate driver 400 and a data driver 500 that are connected to the LC panel assembly 300, a gray voltage generator 800 connected to the data driver 500, and a signal controller 600 for controlling the above elements.

The LC panel assembly 300 includes a plurality of signal lines (not shown in FIG. 1), and a plurality of pixels PX connected to the signal lines and arranged substantially in a matrix, as seen in the block diagram. On the other hand, the LC panel assembly 300 includes lower and upper panels 100 and 200, also respectively known as thin film transistor ("TFT") array panel and common electrode panel, that face each other and a liquid crystal ("LC") layer 3 interposed therebetween, in a structural view shown in FIG. 2.

The signal lines include a plurality of gate lines G for transmitting gate signals (also referred to as "scanning signals") Vg and a plurality of data lines D for transmitting data signals Vd. The gate lines G extend substantially in a row direction, a first direction, and substantially parallel to each other, and the data lines D extend substantially in a column direction, a second direction, and substantially parallel to each other. The first direction and the second direction may be substantially perpendicular to each other.

The signal lines also include first storage electrode lines Sa for transmitting first storage electrode signals and second storage electrode lines Sb for transmitting second storage electrode signals. The phases of the first storage electrode signals and the second storage electrode signals are opposite to each other.

Each pixel PX includes a first sub-pixel PX1 and a second sub-pixel PX2, and each sub-pixel PX1 and PX2 respectively includes a switching element Q1 and Q2, a liquid crystal capacitor Clc1 and Clc2, and one or two storage capacitors Cst1, Cst2, and Cst3. The first sub-pixel PX1 includes a storage capacitor Cst1, and the second sub-pixel PX2 includes two storage capacitors Cst2 and Cst3.

The first and second switching elements Q1 and Q2 may be thin film transistors ("TFTs"). Each of the first and second switching elements Q1 and Q2 has a control terminal, such as a gate electrode, connected to a gate line G, an input terminal, such as a source electrode, connected to a data line D, and an output terminal, such as a drain electrode, connected to a liquid crystal capacitor Clc1 and Clc2 and one or two storage capacitors Cst1, Cst2, and Cst3.

The liquid crystal capacitor Clc1/Clc2 includes a sub-pixel electrode 191a/191b provided on the lower panel 100 and a common electrode 270 provided on the upper panel 200 as two terminals, and the LC layer 3 disposed between the sub-pixel electrode 191a/191b and the common electrode 270 functions as a dielectric of the liquid crystal capacitor Clc1/Clc2. One pair of sub-pixel electrodes 191a and 191b are separated from each other and form a pixel electrode 191 for the pixel PX. The common electrode 270 is formed on the entire surface, or substantially the entire surface, of the upper panel 200 and is supplied with a common voltage Vcom. The LC layer 3 has negative dielectric anisotropy, and the LC molecules in the LC layer 3 may be aligned such that their major axes are substantially perpendicular to the two panels 100, 200 in the absence of an electric field.

Figure 3A:
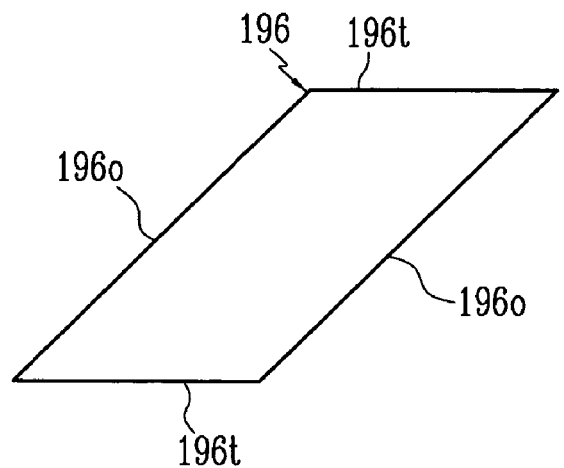
FIG. 3A and FIG. 3B describe portions of an exemplary pixel electrode of an exemplary LCD according to an exemplary embodiment of the present invention.
Figure 3B:
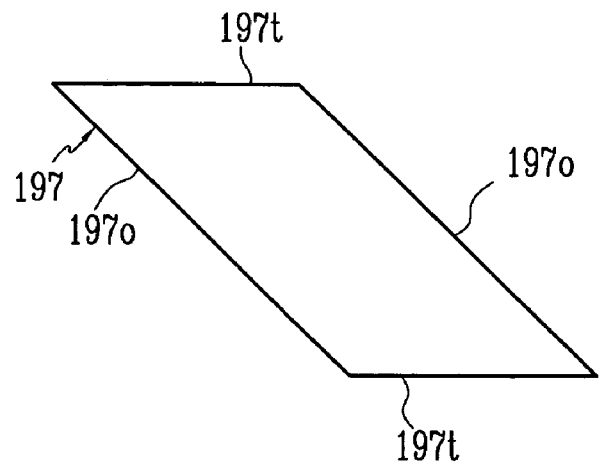

Each of the sub-pixel electrodes 191a and 191b includes at least one parallelogrammic electrode piece 196 illustrated in FIG. 3A and one parallelogrammic electrode piece 197 illustrated in FIG. 3B.

As shown in FIG. 3A and FIG. 3B, each of the electrode pieces 196 and 197 has a pair of oblique edges 196o and 197o that may be parallel to each other and a pair of transverse edges 196t and 197t that may be parallel to each other and substantially has a shape of a parallelogram. Each oblique edge 196o and 197o forms an oblique angle with the transverse edges 196t and 197t, and the preferable oblique angle ranges from about 45 degrees to about 135 degrees. Hereinafter, for convenience sake, the shape of the electrode pieces

196 and 197 is classified according to the direction of inclination ("inclination direction") from a perpendicular state with respect to the bottom transverse edges 196*t* and 197*t*, and it is referred to as "right inclination" when the inclination direction is to the right as shown in FIG. 3A and as "left inclination" when the inclination direction is to the left. An exemplary sup-pixel electrode 191*a* or 191*b* may include one parallelogrammic electrode piece 197 positioned adjacent one parallelogrammic electrode piece 196, such that one transverse edge 196*t* abuts one transverse edge 197*t*.

With reference again to FIG. 2, the storage capacitor Cst1 of the first sub-pixel PX1 is connected to a switching element Q1 and a first storage electrode line Sa, one storage capacitor Cst2 of the second sub-pixel PX2 is connected to a switching element Q2 and a first storage electrode line Sa, and the other storage capacitor Cst3 of the second sub-pixel PX2 is connected to the switching element Q2 and a second storage electrode line Sb. The storage capacitances of the two storage capacitors Cst2 and Cst3 of the second sub-pixel PX2 may be identical to each other.

In the meantime, in order to implement color display, each pixel PX uniquely displays one of a set of colors such as primary colors (spatial division) or each pixel PX sequentially displays the colors in turn (temporal division) such that the spatial or temporal sum of the colors is recognized as a desired color. An example of a set of the colors includes red, green, and blue colors. FIG. 2 shows an example of the spatial division in which each pixel PX includes a color filter 230 representing one of the colors in an area of the upper panel 200. In an alternative embodiment, the color filter 230 may be provided on or under the sub-pixel electrode 191*a*/191*b* provided on the lower panel 100.

Polarizers (not shown) may be provided on the outer surfaces of the panels 100 and 200 respectively, and one of the two polarizers may be omitted when the LCD is a reflective LCD. The polarization axes of the two polarizers may be perpendicular to each other, and when the polarization axes thereof are perpendicular to each other, light that is incident into the LC layer 3 in the absence of an electric field cannot pass through the polarizer.

Referring to FIG. 1 again, the gray voltage generator 800 generates a plurality of gray voltages (or reference gray voltages) related to the transmittance of the pixels PX.

The gate driver 400 is connected to the gate lines G of the LC panel assembly 300 and synthesizes a gate-on voltage Von and a gate-off voltage Voff to generate gate signals Vg, which are applied to the gate lines G.

The data driver 500 is connected to the data lines D of the LC panel assembly 300 and selects the gray voltages supplied from the gray voltage generator 800 and then applies the selected gray voltages to the data lines D as data signals Vd. However, in the case when the gray voltage generator 800 supplies only reference gray voltages of a predetermined number while not supplying voltages for all grays, the data driver 500 divides the reference gray voltages to generate gray voltages for all grays, from which a data signal Vd is selected.

The signal controller 600 controls the gate driver 400 and the data driver 500.

Each of the drivers 400, 500, 600, and 800 may be directly mounted on the LC panel assembly 300 in the form of at least one integrated circuit ("IC") chip, or it may be mounted on a flexible printed circuit ("FPC") film (not shown) in a tape carrier package ("TCP") type that is attached to the LC panel assembly 300 or that may be mounted on a separate printed circuit board ("PCB", not shown). On the other hand, each of the drivers 400, 500, 600, and 800 may be integrated into the LC panel assembly 300. Also, the drivers 400, 500, 600, and 800 may be integrated into a single chip, and in this case, at least one thereof or at least one circuit element forming them may be located outside of the single chip.

The LC panel assembly 300 will be further described with reference to FIG. 4 to FIG. 6.

Figure 4:
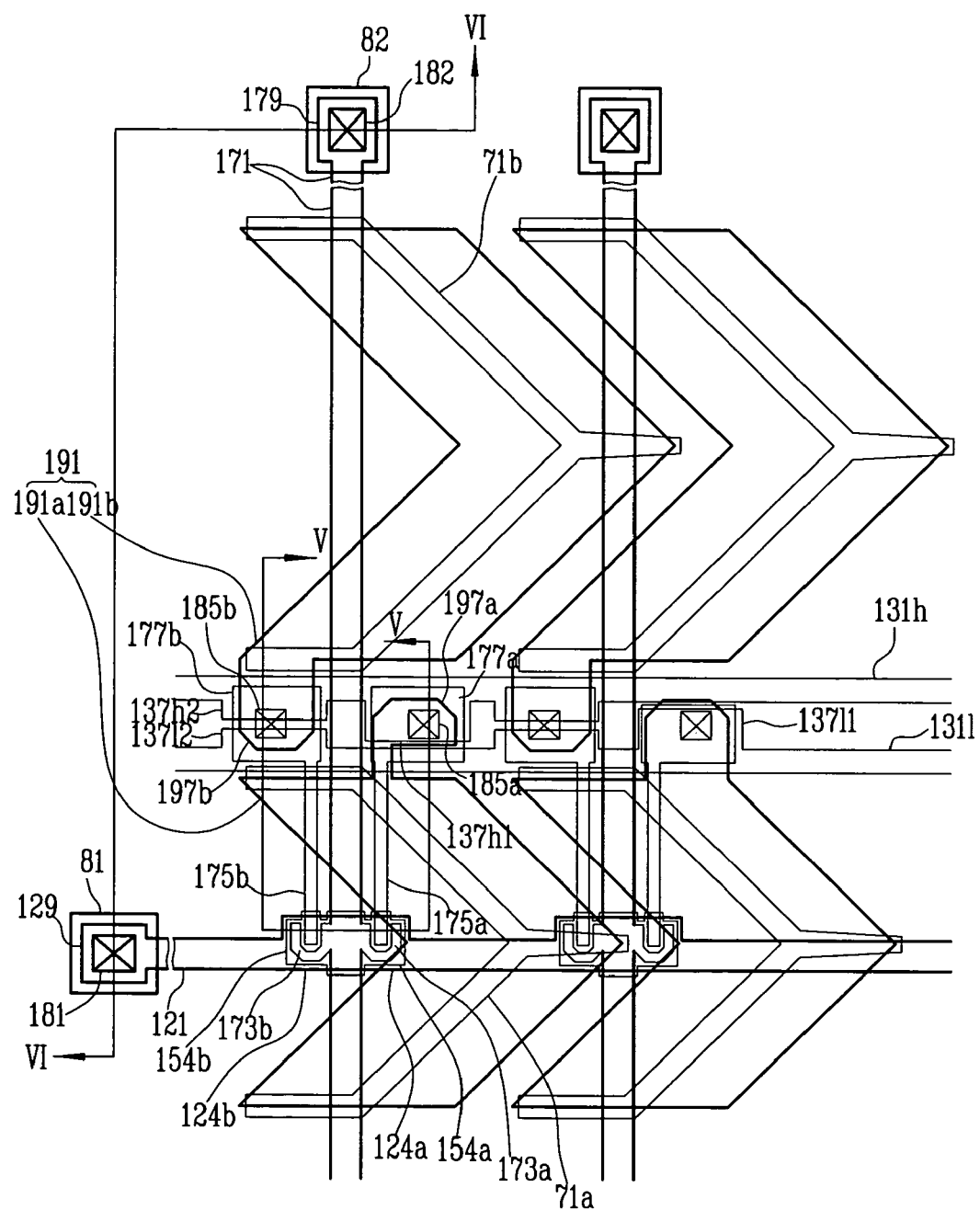
FIG. 4 is a layout view illustrating an exemplary LCD according to an exemplary embodiment of the present invention.
Figure 5:
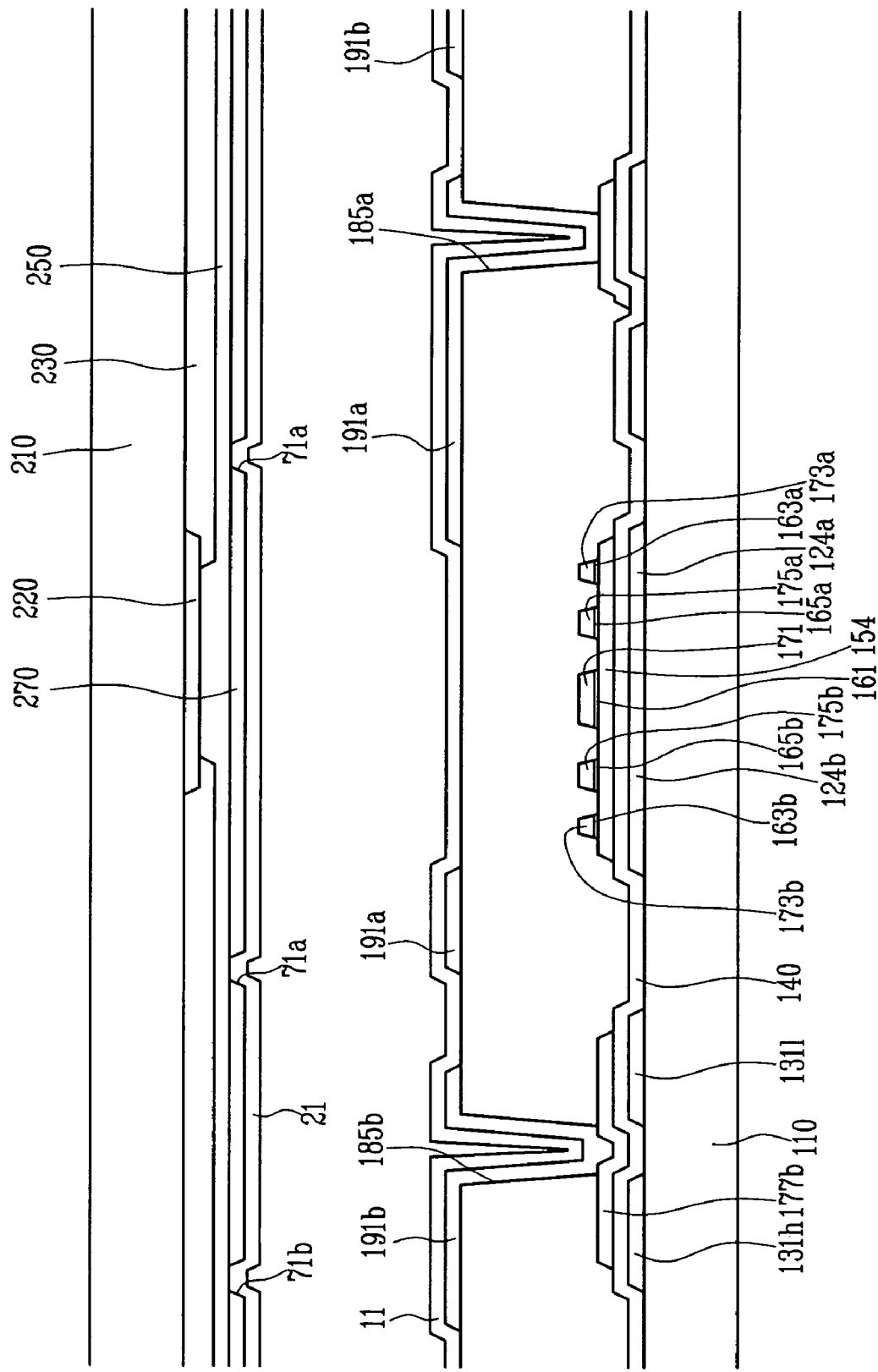
FIG. 5 and FIG. 6 are sectional views of the exemplary LCD illustrated in FIG. 4 taken along line V-V and line VI-VI, respectively.
Figure 6:
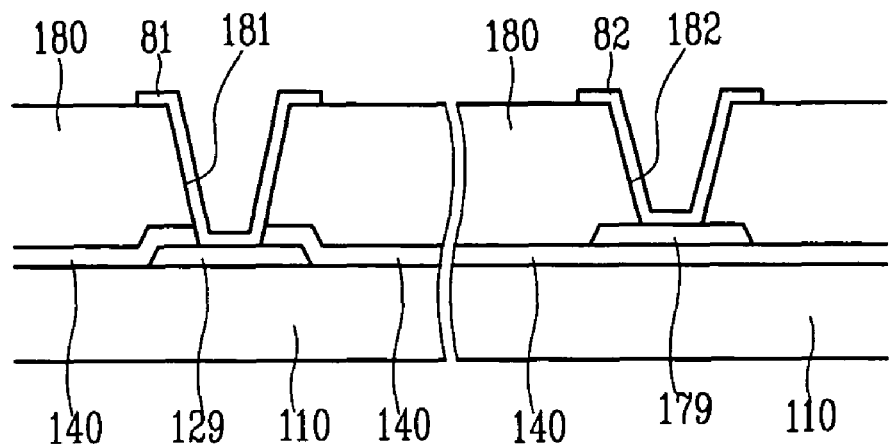

FIG. 4 is a layout view illustrating an exemplary LCD according to an exemplary embodiment of the present invention, and FIG. 5 and FIG. 6 are sectional views of the exemplary LCD illustrated in FIG. 4 taken along line V-V and line VI-VI, respectively.

Referring to FIG. 4 to FIG. 6, the LC panel assembly 300 includes a TFT array panel 100, a common electrode panel 200, and an LC layer 3 interposed there between.

First, the TFT array panel 100 is further described.

A plurality of gate lines 121 and a plurality of pairs of first and second storage electrode lines 131*h* and 131*l* are formed on an insulating substrate 110 which is preferably made of transparent glass or plastic.

The gate lines 121 for transmitting gate signals Vg extend substantially in a transverse direction, the first direction. Each of the gate lines 121 includes a plurality of gate electrodes 124*a* and 124*b* that protrude, for example, upward and downward in plan view and an end portion 129 having a large area for connection with another layer or a gate driver 400.

The first and second storage electrode lines 131*h* and 131*l* that are supplied with a predetermined voltage extend in the first direction nearly parallel to the gate line 121 and are adjacent to each other. The first storage electrode line 131*h* that is located upward, further from the gate line 121 of the respective pixel PX, includes first and second storage electrodes 137*h*1 and 137*h*2 that protrude downward towards the second storage electrode line 131*l*, and are disposed in turn, and the second storage electrode line 131*l* that is located downward, closer to the gate line 121 of the respective pixel PX and between the first storage electrode line 131*h* and the gate line 121, includes third and fourth storage electrodes 137*l*1 and 137*l*2 that protrude upward towards the first storage electrode line 131*h*, and are disposed in turn. The second storage electrode 137*h*2 and the fourth storage electrode 137*l*2 face each other, and the first storage electrode 137*h*1 and the third storage electrode 137*l*1 are disposed alternately. However, the shapes and disposition of the storage electrode lines 131*h* and 131*l* and their storage electrodes 137*h*1, 137*h*2, 137*l*1, and 137*l*2 may be changed in various ways.

The gate lines 121 and the storage electrode lines 131*h* and 131*l* are preferably made of an aluminum Al-containing metal such as Al and an Al alloy, a silver Ag-containing metal such as Ag and a Ag alloy, a copper Cu-containing metal such as Cu and a Cu alloy, a molybdenum Mo-containing metal such as Mo and a Mo alloy, chromium Cr, tantalum Ta, and titanium Ti. However, the gate lines 121 and the storage electrode lines 131*h* and 131*l* may have a multi-layered structure including two conductive films (not shown) having different physical characteristics. In one exemplary multi-layered structure, one of two conductive films may be made of a low resistivity metal such as an Al-containing metal, a Ag-containing metal, or a Cu-containing metal for reducing signal delay or voltage drop, and the other conductive film may be made of a material such as a Mo-containing metal, Cr, Ti, and Ta, which has good physical, chemical, and electrical contact characteristics with other materials such as indium tin oxide ("ITO") or indium zinc oxide ("IZO"). Good examples of the combination of two films in such a multi-layered structure include a pair of a lower Cr film and an upper Al (alloy) film, and a pair of a lower Al (alloy) film and an upper Mo (alloy) film. However, the gate lines 121 and the storage electrode lines 131*h* and 131*l* may be made of many various metals or conductive materials besides the above.

The lateral sides of the gate lines 121 and the storage electrode lines 131*h* and 131*l* are inclined relative to a surface of the substrate 110, and the preferable inclination angle thereof ranges from about 30 degrees to about 80 degrees.

A gate insulating layer 140 preferably made of silicon nitride (SiNx) or silicon oxide (SiOx) is formed on the gate lines 121 and the storage electrode lines 131*h* and 131*l*, and may be further formed on exposed areas of the insulating substrate 110.

A plurality of first and second semiconductor islands 154*a* and 154*b* preferably made of hydrogenated amorphous silicon (abbreviated to "a-Si") or polysilicon are formed on the gate insulating layer 140. The first and second semiconductor islands 154*a* and 154*b* are located on the first and second gate electrodes 124*a* and 124*b*, respectively.

A pair of ohmic contact islands 163*a* and 165*a* is formed on each of the first semiconductor islands 154*a*, and a pair of ohmic contact islands 163*b* and 165*b* is formed on each of the second semiconductor islands 154*b*. The ohmic contacts 163*a*, 165*a*, 163*b*, and 165*b* are preferably made of n+hydrogenated a-Si heavily doped with an n-type impurity such as phosphorus (P) or silicide and may extend from ohmic contact stripes 161 extending in the second direction.

The lateral sides of the semiconductors 154*a* and 154*b* and the ohmic contacts 163*a*, 165*a*, 163*b*, and 165*b* are inclined relative to a surface of the substrate 110, and the preferable inclination angle thereof ranges from about 30 degrees to about 80 degrees.

A plurality of data conductors including a plurality of data lines 171 and a plurality of pairs of first and second drain electrodes 175*a* and 175*b* are formed on the ohmic contacts 161, 163*a*, 165*a*, 163*b*, and 165*b* and the gate insulating layer 140.

The data lines 171 for transmitting data signals extend substantially in the longitudinal direction, the second direction, and intersect the gate lines 121 and the storage electrode lines 131*h* and 131*l*. The data lines 171 may extend over the ohmic contact stripes 161. Each data line 171 includes a plurality of pairs of first and second source electrodes 173*a* and 173*b* branched out toward the first and second gate electrodes 124*a* and 124*b* to be curved in the shape of a letter "U", and an end portion 179 having a large area for connection with another layer or a data driver 500. When the data driver 500 is integrated on the substrate 110, the data lines 171 may extend to be directly connected to it.

The first and second drain electrodes 175*a* and 175*b* are separated from each other and also from the data lines 171. The first/second drain electrodes 175*a*/175*b* oppose the first/second source electrodes 173*a*/173*b* with respect to the first/second gate electrodes 124*a*/124*b*.

The first/second drain electrodes 175*a*/175*b* extend upward, in a direction away from the gate line 121, straightly from an end that is partially surrounded by the first/second source electrodes 173*a*/173*b*. The first/second drain electrodes 175*a*/175*b* include expansions 177*a*/177*b* that extend near the intersection with the storage electrode lines 131*h* and 131*l*. The expansion 177*a* of the first drain electrode 175*a* overlaps a first storage electrode 137*h*1 or third storage electrode 137/1, and the expansion 177*b* of the second drain electrode 175*b* overlaps a second storage electrode 137*h*2 and may further overlap a fourth storage electrode 137/2. The expansions 177*a* of the first drain electrodes 175*a* that are adjacent to each other in the row and column direction overlap different storage electrodes 137*h*1 and 137/1.

The first/second gate electrode 124*a*/124*b*, the first/second source electrode 173*a*/173*b*, and the first/second drain electrode 175*a*/175*b*, along with the first/second semiconductor 154*a*/154*b*, form the first/second TFT Q1/Q2 having a channel formed in the first/second semiconductor 154*a*/154*b* disposed between the first/second source electrode 173*a*/173*b* and the first/second drain electrode 175*a*/175*b*.

The data conductors 171, 175*a*, and 175*b* are preferably made of a refractory metal such as Mo, Cr, Ta, and Ti or an alloy thereof. Also, the data line 171 and the drain electrodes 175*a*, 175*b* may have a multi-layered structure including a refractory metal film (not shown) and a conductive film (not shown) having low resistivity. Examples of a multi-layered structure include double layers of a lower Cr or Mo (alloy) film and an upper Al (alloy) film, and triple layers of a lower Mo (alloy) film, an intermediate Al (alloy) film, and an upper Mo (alloy) film. However, the data conductors 171, 175*a*, and 175*b* may be made of many various metals or conductive materials besides the above.

The lateral sides of the data conductors 171, 175*a*, and 175*b* are also inclined relative to a surface of the substrate 110, and the inclination angles thereof are preferably in a range of about 30 degrees to about 80 degrees.

The ohmic contacts 161, 163*a*, 165*a*, 163*b*, and 165*b* are interposed only between the underlying semiconductors 154*a* and 154*b* and the overlying data conductors 171, 175*a*, and 175*b* thereon and reduce the contact resistance there between. The semiconductors 154*a* and 154*b* include exposed portions that are not covered with the data conductors 171, 175*a*, and 175*b* such as portions located between the source electrodes 173*a* and 173*b* and the drain electrodes 175*a* and 175*b*.

A passivation layer 180 is formed on the data conductors 171, 175*a*, and 175*b*, and the exposed portions of the semiconductors 154*a* and 154*b*, as well as on any exposed portion of the gate insulating layer 140. The passivation layer 180 may be made of an organic insulator that has a lower dielectric constant and can make the thickness thereof greater. Hereby, formation of parasitic capacitances can be prevented by insulating pixel electrodes 191 from data lines 171 even though the pixel electrodes 191 and the data lines 171 overlap each other. The organic insulator of the passivation layer 180 may have photosensitivity, and the preferable dielectric constant thereof is lower than about 4.0. However, the passivation layer 180 may be made of an inorganic insulator or have a double-layered structure including a lower inorganic film and an upper organic film in order to not harm the exposed portions of the semiconductors 154*a* and 154*b* and to make the most of the substantial insulating property of an organic film.

The passivation layer 180 has a plurality of contact holes 182 exposing the end portions 179 of the data lines 171, a plurality of contact holes 185*a* exposing the expansions 177*a* of the first drain electrodes 175*a*, and a plurality of contact holes 185*b* exposing the expansions 177*b* of the second drain electrodes 175*b*. The passivation layer 180 and the gate insulating layer 140 have a plurality of contact holes 181 exposing the end portions 129 of the gate lines 121.

A plurality of pixel electrodes 191 and a plurality of contact assistants 81 and 82 are formed on the passivation layer 180. These may be made of a transparent conductor such as ITO or IZO, or a reflective metal such as Al, Ag, Cr, or an alloy thereof.

Each pixel electrode 191 within each pixel PX includes a pair of first and second sub-pixel electrodes 191*a* and 191*b* that are separated from and adjacent to each other in the column direction. Each of the first and second sub-pixel electrodes 191*a* and 191*b* includes two parallelogrammic electrode pieces, as described in FIG. 3A and FIG. 3B, of which the inclination directions are opposite to each other, and the oblique edges of the two electrode pieces are connected to each other to form a pair of curved or angled edges that are each curved or angled once to form an arrow shape. Aside from projections as will be described below, the first sub-pixel electrode 191a may be generally disposed on one side of the second storage electrode line 131l and the second sub-pixel electrode 191b may be generally disposed on one side of the first storage electrode line 131h. Also, the area of the first sub-pixel electrode 191a is smaller than the area of the second sub-pixel electrode 191b.

The first/second sub-pixel electrode 191a/191b includes a projection 197a/197b branched out over the expansion 177a/177b of the first/second drain electrode 175a/175b. The projection 197b may protrude from a lower left corner of the second sub-pixel electrode 191b, and the projection 197a may protrude from an upper right corner of the first sub-pixel electrode 191a.

The first sub-pixel electrodes 191a are connected to the first drain electrodes 175a through the contact holes 185a, and the second sub-pixel electrodes 191b are connected to the second drain electrodes 175b through the contact holes 185b. The contact holes 185a and 185b are aligned over the expansions 177a and 177b of the drain electrodes 175a and 175b.

A first/second sub-pixel electrode 191a/191b and the common electrode 270 provided on the upper panel 200, along with the LC layer 3 disposed there between, form a first/second liquid crystal capacitor Clc1/Clc2 to store applied voltages even after the TFT Q1/Q2 is turned off.

A first sub-pixel electrode 191a and a first drain electrode 175a connected thereto overlap a first or third storage electrode 137h1 or 137l1 to form a first storage capacitor Cst1. In adjacent pixels, the first storage capacitor Cst1 is formed by alternately overlapping either the first or third storage electrodes 137h1 or 137l1. Also, a second sub-pixel electrode 191b and a second drain electrode 175b connected thereto overlap a second storage electrode 137h2 to form a second storage capacitor Cst2 and overlap a fourth storage electrode 137l2 to form a third storage capacitor Cst3. These storage capacitors Cst1, Cst2, and Cst3 enhance the voltage storing capacity of the liquid crystal capacitors Clc1 and Clc2.

The contact assistants 81 and 82 are connected to the end portion 129 of the gate line 121 and the end portion 179 of the data line 171 through the contact holes 181 and 182, respectively. The contact assistants 81 and 82 supplement the adhesive property of the end portions 129 of the gate lines 121 and the end portions 179 of the data lines 171 to exterior devices, and protect them.

Next, a description of the upper panel, the common electrode panel, 200 follows.

A light blocking member 220 is formed on an insulating substrate 210 preferably made of transparent glass or plastic. The light blocking member 220 may include curved or angled portions (not shown) facing the curved or angled edges of the pixel electrodes 191 and quadrilateral portions (not shown) facing the TFTs, and the light blocking member 220 defines opening areas opposed to the pixel electrodes 191 and also prevents the leakage of light between the pixel electrodes 191.

A plurality of color filters 230 are also formed on the substrate 210 and the light blocking member 220. The color filters 230 are disposed substantially in the areas enclosed by the light blocking member 220 and may extend in a longitudinal direction substantially along the pixel electrodes 191. Each of the color filters 230 may represent one of three main colors or primary colors such as red, green, and blue colors.

An overcoat 250 is formed on the color filters 230 and the light blocking member 200. The overcoat 250 is preferably made of an organic insulator and it prevents the color filters 230 from being exposed and also provides a flat surface. Alternatively, the overcoat 250 may be omitted.

A common electrode 270 is formed on the overcoat 250. The common electrode 270 is preferably made of a transparent conductive material such as ITO and IZO and has a plurality of cutouts 71a and 71b.

The number of cutouts 71a and 71b may be varied depending on design factors, and the light blocking member 220 preferably overlaps the cutouts 71a and 71b to block leakage of light through the cutouts 71a and 71b. As shown in FIG. 4, the cutouts 71a and 71b may be formed on an area of the common electrode 270 corresponding, in part, to a central area between parallel edges of the sub-pixel electrodes 191a and 191b.

Alignment layers 11 and 21 are coated on inner surfaces of the panels 100 and 200 and they may be homeotropic.

Polarizers (not shown) may be provided on outer surfaces of the panels 100 and 200, and their polarization axes may be perpendicular to each other and preferably make an angle of about 45 degrees with the curved edges of the sub-pixel electrodes 191a and 191b. One of the polarizers may be omitted when the LCD is a reflective LCD.

The LCD may further include a retardation film (not shown) and a backlight unit (not shown) for supplying light to the LC layer 3.

The LC layer 3 is in a state of negative dielectric anisotropy, and the LC molecules in the LC layer 3 are aligned such that their long axes are substantially vertical to the surfaces of the panels 100 and 200 in the absence of an electric field.

Cutouts 71a and 71b on the common electrode 270 may be substituted by protrusions (not shown) or depressions (not shown).

The protrusions may be made of organic or inorganic material and disposed on or under the field-generating electrodes 191 and 270.

Now, the operation of the LCD illustrated in FIG. 1 to FIG. 6 will be described.

The signal controller 600 is supplied with input image signals R, G, and B and input control signals for controlling the display thereof from an external graphics controller (not shown). The input image signals R, G, and B include luminance information of each pixel PX, and the luminance has a predetermined number of, for example, 1024 ($=2^{10}$), 256 ($=2^8$), or 64 ($=2^6$) grays. The input control signals include for example, a vertical synchronization signal Vsync, a horizontal synchronization signal Hsync, a main clock signal MCLK, and a data enable signal DE.

On the basis of the input control signals and the input image signals R, G, and B, the signal controller 600 adequately processes the input image signals R, G, and B suitably for the operating condition of the LC panel assembly 300 and the data driver 500 and generates gate control signals CONT1 and data control signals CONT2. Then, the signal controller 600 transmits the gate control signals CONT1 to the gate driver 400 and transmits the processed image signals DAT and the data control signals CONT2 to the data driver 500. The output image signals DAT are digital signals having a predetermined number of values (or grays).

The gate control signals CONT1 include a scanning start signal STV for instructing to start scanning and at least one clock signal for controlling the output time of the gate-on voltage Von. The gate control signals CONT1 may further include an output enable signal OE for defining the duration of the gate-on voltage Von.

The data control signals CONT2 include a horizontal synchronization start signal STH for informing a start of image data transmission for a packet of pixels PX, a load signal LOAD for instructing to apply the data signals Vd to the LC panel assembly 300, and a data clock signal HCLK. The data control signal CONT2 may further include an inversion signal RVS for reversing the polarity of the data signals with respect to the common voltage Vcom (hereinafter, "polarity of the data signals with respect to the common voltage Vcom" is referred to as "polarity of the data signals").

Responding to the data control signals CONT2 from the signal controller 600, the data driver 500 sequentially receives the digital image signals DAT for the packet of pixels PX, selects gray voltages corresponding to the respective digital image signal DAT, converts the digital image signals DAT into analog data signals Vd, and applies the analog data signals Vd to the corresponding data lines 171. Here, data signals Vd having opposite polarities to each other are applied to adjacent data lines 171.

The gate driver 400 applies the gate-on voltage Von to the gate lines 121 as gate signals Vg in response to the gate control signals CONT1 from the signal controller 600, thereby turning on the switching elements Q1 and Q2 connected to the gate lines 121. Then, data signals Vd applied to the data lines 171 are applied to the corresponding sub-pixels PX1 and PX2 through the turned-on switching elements Q1 and Q2.

Next, the gate-off voltage Voff is applied to the gate lines G as gate signals Vg to turn off the switching elements Q1 and Q2.

In the meantime, first and second storage electrode signals having opposite phases to each other are applied to the first storage electrode lines 131h and the second storage electrode lines 131l, respectively, and each of the voltage levels of the first and second storage electrode signals is reversed after the switching elements Q1 and Q2 are turned off. Then, the voltage of the first sub-pixel electrode 191a applied with only one of the first and second storage electrode signals in the first sub-pixel PX1, rises or falls, due to the projection 197a that is connected to the expansion 177a that overlaps either the first storage electrode 137h1 extending from the first storage electrode line 131h or the third storage electrode 137l1 extending from the second storage electrode line 131l, and the voltage of the second sub-pixel electrode 191b applied with both of the first and second storage electrode signals in the second sub-pixel PX2 is subject to almost no change due to the offset of the rise and the fall, due to the projection 197b that connects to the expansion 177b that overlaps both the second storage electrode 137h2 extending from the first storage electrode line 131h and the fourth storage electrode 137l2 extending from the second storage electrode line 131l. Here, the voltage of the storage electrode signal applied to the first sub-pixel PX1 that is applied with a data voltage Vd having a positive polarity rises, and on the contrary, the voltage of the storage electrode signal applied to the first sub-pixel PX1 that is applied with a data voltage Vd having a negative polarity falls. In this way, the voltage of the first sub-pixel electrode 191a becomes greater than the voltage of the second sub-pixel electrode 191b, and accordingly, the voltage across the first liquid crystal capacitor Clc1 becomes greater than the voltage across the second liquid crystal capacitor Clc2.

In this way, when the potential difference is generated across the first or the second liquid crystal capacitor Clc1 or Clc2, a primary electric field that is substantially perpendicular to the surfaces of the panels 100 and 200 is generated in the LC layer 3. Hereinafter, the pixel electrode 191 and the common electrode 270 are altogether referred to as "field generating electrodes". The LC molecules in the LC layer 3 tilt in response to the electric field such that their long axes become perpendicular to the electric field direction, and the degree of the tilt of the LC molecules determines the change of the polarization of incident light onto the LC layer 3. This change of the light polarization causes a change of light transmittance through the polarizers, and in this way, the LCD displays images.

The tilt angle of the LC molecules depends on the strength of the electric field. Since the voltages of the two liquid crystal capacitors Clc1 and Clc2 are different from each other, the tilt angles of the LC molecules are also different from each other and thus the luminances of the two sub-pixels PX1 and PX2 are different from each other. Accordingly, voltage of the first liquid crystal capacitor Clc1 and voltage of the second liquid crystal capacitor Clc2 can be adjusted so that an image viewed from a lateral side is most similar to an image viewed from the front, that is, the lateral gamma curve can be made to be most similar to the frontal gamma curve, thereby improving the lateral visibility.

Also, when the area of the first sub-pixel electrode 191a applied with higher voltage is formed to be smaller than the area of the second sub-pixel electrode 191b, the lateral gamma curve can be more similar to the frontal gamma curve.

By repeating this procedure by a unit of the horizontal period (which is also denoted as "1H" and is equal to one period of the horizontal synchronization signal Hsync and the data enable signal DE), all gate lines G are sequentially supplied with the gate-on voltage Von, thereby applying the data signals Vd to all pixels PX to display an image for a frame.

When the next frame starts after one frame is finished, the inversion signal RVS applied to the data driver 500 is controlled such that the polarity of the data signals Vd applied to each pixel PX is reversed to be opposite to the polarity in the previous frame (which is referred to as "frame inversion").

Now, an exemplary inversion driving method of an exemplary LCD according to exemplary embodiments of the present invention will be described with reference to FIG. 7 and FIG. 8 along with FIG. 1 and FIG. 4 described above.

Figure 7:
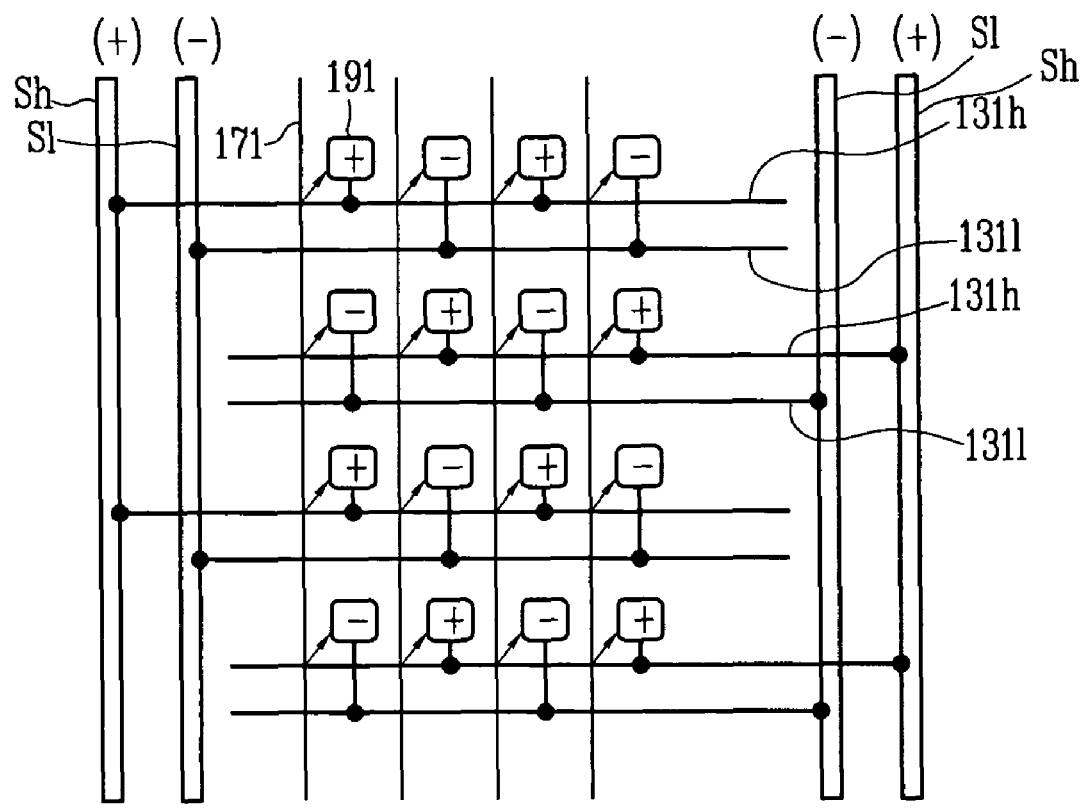
FIG. 7 illustrates polarity of each exemplary pixel electrode of an exemplary LCD according to an exemplary embodiment of the present invention when inversion driving is performed.
Figure 8:
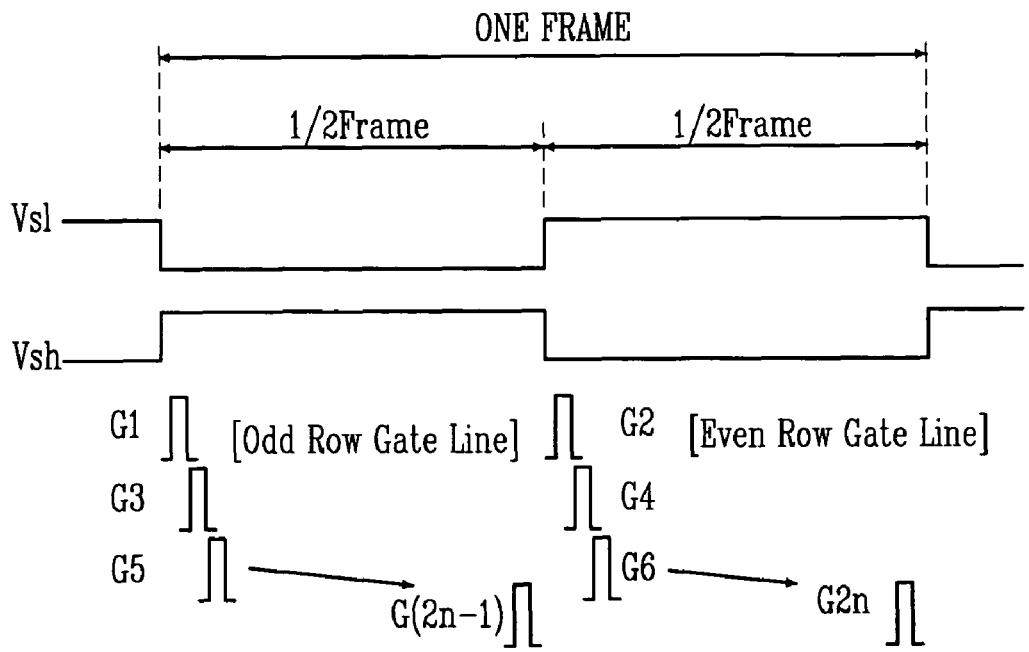
FIG. 8 is a waveform diagram illustrating exemplary voltages when inversion driving illustrated in FIG. 7 is performed.

FIG. 7 describes an exemplary inversion driving method of an exemplary LCD according to an exemplary embodiment of the present invention, and FIG. 8 is a waveform diagram illustrating voltages applied in the exemplary inversion driving method illustrated in FIG. 7.

Referring to FIG. 7, in each row of pixels, the first sub-pixels PX1 of the odd pixels are connected to the first storage electrode line 131h, and the first sub-pixels PX1 of the even pixels are connected to the second storage electrode line 131l. Also, the first storage electrode lines 131h are connected to first signal lines Sh, and the second storage electrode lines 131l are connected to second signal lines Sl. The first and second signal lines Sh and Sl may extend substantially parallel to the data lines 171 and may be connected to either ends of the first and second storage electrode lines 131h and 131l.

Referring to FIG. 8, the gate-on voltage Von is applied to the gate lines 121 in the odd rows, thereby charging pixels PX in the odd rows connected thereto during the first half frame. Here, in each odd row of pixels, the odd pixels are applied with data voltages Vd having a positive polarity, and the even pixels are applied with data voltages Vd having a negative polarity.

During that time, the first storage electrode signals Vsh applied to the first storage electrode lines 131h are maintained at the low level, and the second storage electrode signals Vsl applied to the second storage electrode lines 131l are maintained at the high level.

After finishing charging of the odd rows of pixels, the first storage electrode signals Vsh rise to the high level, and the second storage electrode signals Vsl fall to the low level.

Then, in the odd rows of pixels, the voltages of the odd first sub-pixel electrodes 191a connected to the first storage electrode line 131h rise, and the voltages of the even first sub-pixel electrodes 191a connected to the second storage electrode line 131l fall, but the voltages of the second sub-pixel electrodes 191b connected to both of the first and second storage electrode lines 131h and 131l are subject to almost no change due to the offset of the rise and the fall. However, since the polarity of voltages of the odd first sub-pixel electrodes 191a is positive and the polarity of voltages of the even first sub-pixel electrodes 191a is negative, the voltages of the first sub-pixel electrodes 191a become farther from the common voltage Vcom irrespective of polarity thereof. Consequently, in the odd rows of pixels, the voltages across the first liquid crystal capacitors Clc1 become greater than the voltages across the second liquid crystal capacitors Clc2.

In the meantime, since the polarity of voltages of the odd first sub-pixel electrodes 191a is negative and the polarity of voltages of the even first sub-pixel electrodes 191a is positive in the even rows of pixels, the voltages across the first liquid crystal capacitors Clc1 in the even rows of pixels also rise.

Next, when the voltage level of the first and second storage electrode signals is changed after finishing charging the even rows of pixels in the second half frame, the voltages across the first liquid crystal capacitors Clc1 become greater than the voltages across the second liquid crystal capacitors Clc2 in the even rows of pixels since the polarity of voltages of the odd first sub-pixel electrodes 191a is negative and the polarity of voltages of the even first sub-pixel electrodes 191a is positive in the even rows of pixels. Here, the voltages across the first liquid crystal capacitors Clc1 in the odd rows of pixels fall again to be almost the same as the voltages across the second liquid crystal capacitors Clc2 in the odd rows of pixels.

In this way, in each pixel PX, the voltage across the liquid crystal capacitor Clc1 of the first sub-pixel PX1 is maintained to be greater than the voltage across the liquid crystal capacitor Clc2 of the second sub-pixel PX2 during a half frame.

Since the luminance of each sub-pixel PX1 and PX2 is a root mean square ("RMS") of the luminances of the first half frame and the latter half frame, the luminance of the first sub-pixel PX1 is greater than the luminance of the second sub-pixel PX2. Consequently, the visibility and transmittance are improved.

Now, an exemplary driving method of an exemplary LCD according to another exemplary embodiment of the present invention will be described with reference to FIG. 9, FIG. 10, and FIG. 11.

Figure 9:
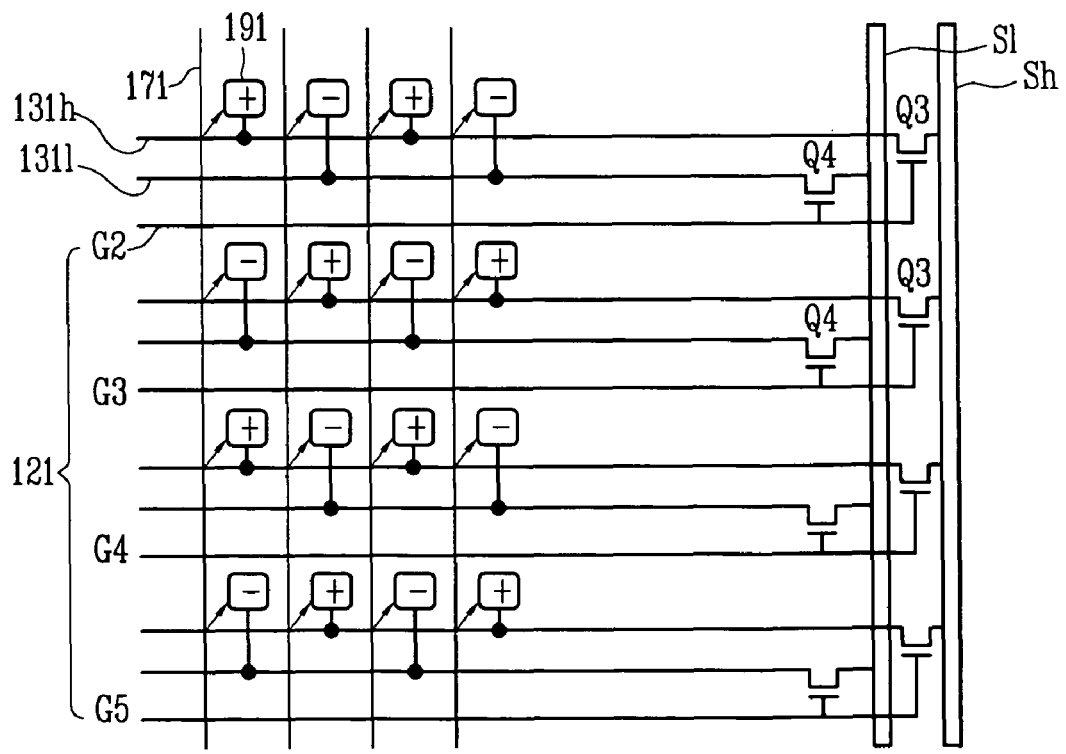
FIG. 9 illustrates polarity of each exemplary pixel electrode of an exemplary LCD according to another exemplary embodiment of the present invention when inversion driving is performed.
Figure 10:
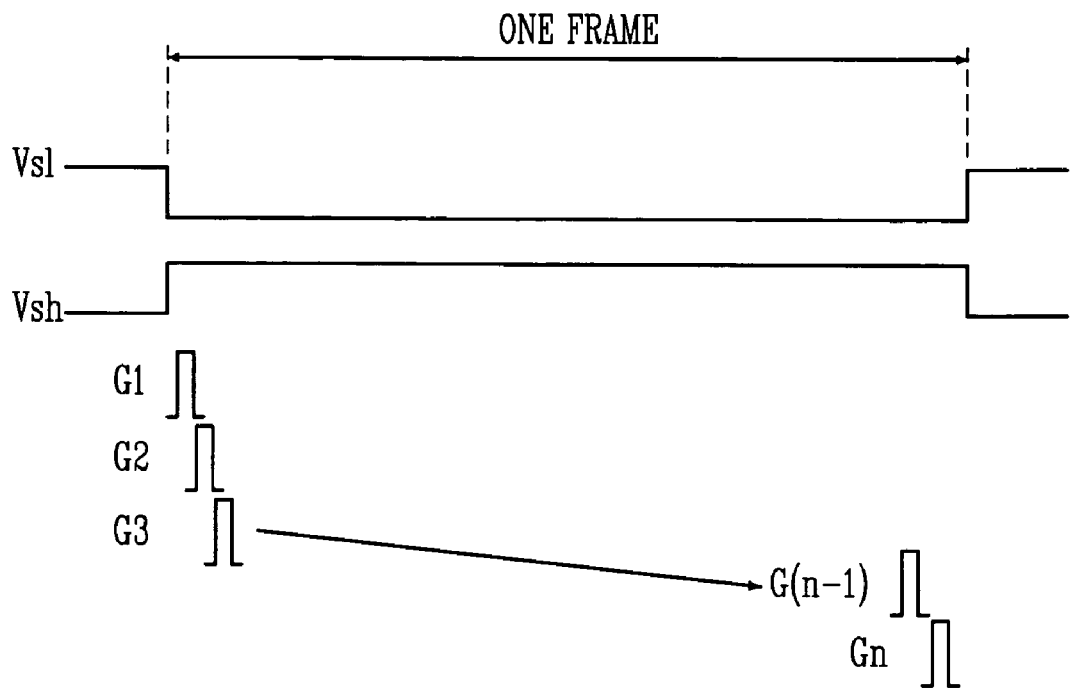
FIG. 10 is a waveform diagram illustrating exemplary voltages when inversion driving illustrated in FIG. 9 is performed; and, FIG. 11 is a waveform diagram illustrating an exemplary pixel voltage along with other exemplary voltages when inversion driving illustrated in FIG. 9 is performed.
Figure 11:
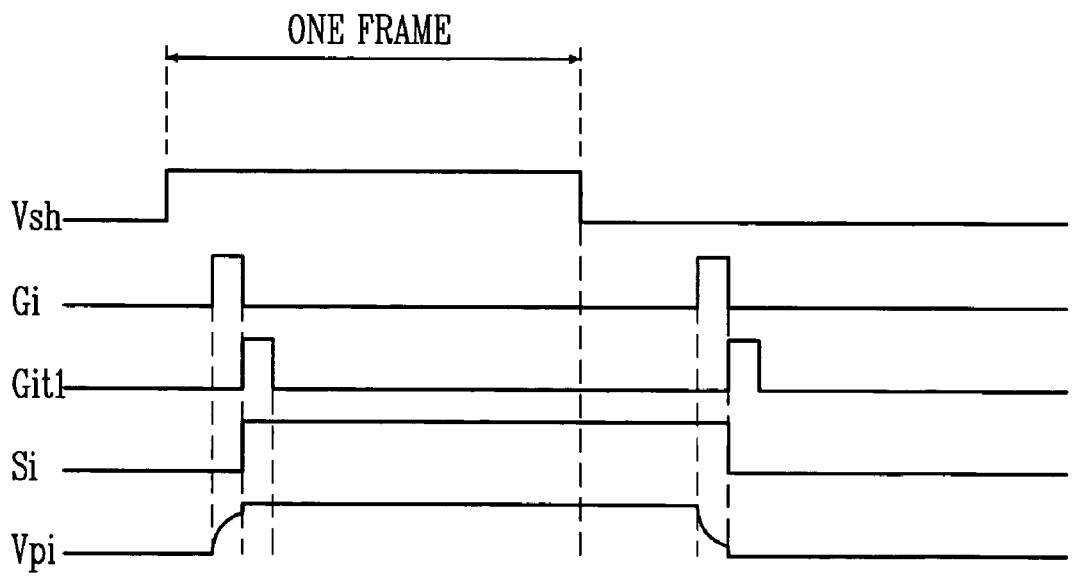

FIG. 9 describes an exemplary driving method of an exemplary LCD according to another exemplary embodiment of the present invention, FIG. 10 is a waveform diagram illustrating the exemplary driving method described in FIG. 9, and FIG. 11 is a waveform diagram illustrating an exemplary pixel voltage along with other exemplary voltages when inversion driving illustrated in FIG. 9 is performed.

Referring to FIG. 9, the first and second storage electrode lines 131h and 131l are connected to the first and second signal lines Sh and Sl through third and fourth switching elements Q3 and Q4, respectively. The control terminal of a third/fourth switching element Q3/Q4 is connected to the following gate line 121, the input terminal thereof is connected to the first/second signal line Sh/Sl, and the output terminal thereof is connected to the first/second storage electrode line 131h/131l.

Referring to FIG. 10, the phases of the first storage electrode signal Vsh applied to the first signal line Sh and the second storage electrode signal Vsl applied to the second signal line Sl are opposite to each other, and the level of the phases changes every one frame. That is, the voltage level of the first storage electrode signal Vsh and the second storage electrode signal Vsl is only changed after charging all of the pixels PX.

Referring to FIG. 11, since the third and fourth switching elements Q3 and Q4 connected to the i-th gate line Gi, for example, are connected to the next row, that is, to the (i+1)-th gate line $G_{i+1}$, the third and fourth switching elements Q3 and Q4 are turned on to transmit the first and second storage electrode signals Vsh and Vsl when the gate-on voltage Von is applied to the (i+1)-th gate line $G_{i+1}$ and turned off when the gate-off voltage Voff is applied to the (i+1)-th gate line $G_{i+1}$. Therefore, the level of the voltage Si of the first/second storage electrode line is varied every one frame, and the pixel voltage Vpi across the liquid crystal capacitor Clc1 of the first sub-pixel PX1 in each row of pixels is subject to a voltage rise or voltage drop immediately after being charged. The pixel voltage Vpi that is subject to a voltage rise or voltage drop maintains the state during one frame.

However, like the above, the luminance of the first sub-pixel PX1 is always greater than the luminance of the second sub-pixel PX2 since the voltage across the liquid crystal capacitor Clc2 of the second sub-pixel PX2 does not change.

In this way, the luminances of two sub-pixels can be made to be different from each other by varying the voltage of the storage electrode lines.

Thus, in the present invention, transmittance and visibility can be improved, and the aperture ratio of an LCD is increased.

Although preferred embodiments of the present invention have been described in detail hereinabove, it should be clearly understood that many variations and/or modifications of the basic inventive concepts herein taught, which may appear to those skilled in the present art, will still fall within the spirit and scope of the present invention, as defined in the appended claims.

What is claimed is:

1. A liquid crystal display including a plurality of pixels, wherein each of the pixels comprises:
   a first and a second liquid crystal capacitor;
   a first storage capacitor including a first terminal directly connected to the second liquid crystal capacitor and a second terminal supplied with a first storage electrode signal;
   a second storage capacitor including a first terminal directly connected to the second liquid crystal capacitor and a second terminal supplied with a second storage electrode signal having an opposite phase of a phase of the first storage electrode signal; and
   a third storage capacitor including a first terminal connected to the first liquid crystal capacitor and a second terminal supplied with the first storage electrode signal or the second storage electrode signal.

2. The liquid crystal display of claim 1, wherein third storage capacitors in adjacent pixels are supplied with different signals selected from the first storage electrode signal and the second storage electrode signal.

3. The liquid crystal display of claim 2, further comprising a plurality of gate lines transmitting a gate signal, and a plurality of data lines transmitting a data voltage, wherein each of the pixels further comprises:

a first switching element connected to a gate line, a data line, a respective first liquid crystal capacitor, and a respective third storage capacitor; and a second switching element connected to the gate line connected to the first switching element, the data line connected to the first switching element, a respective second liquid crystal capacitor, and respective first and second storage capacitors.

4. The liquid crystal display of claim 3, wherein the first and second switching elements connected to even-numbered gate lines are sequentially turned on after the first and second switching elements connected to odd-numbered gate lines are sequentially turned on.

5. The liquid crystal display of claim 4, wherein polarity of the first and second storage electrode signals is varied after the first and second switching elements connected to the odd gate lines are turned on and before the first and second switching elements connected to the even gate lines are turned on, and the polarity of the first and second storage electrode signals is varied after the first and second switching elements connected to the even gate lines are turned on and before the first and second switching elements connected to the odd gate lines are turned on.

6. The liquid crystal display of claim 3, further comprising:
a plurality of first storage electrode lines transmitting the first storage electrode signal;
a plurality of second storage electrode lines transmitting the second storage electrode signal;
a first signal line connecting the plurality of first storage electrode lines;
a second signal line connecting the plurality of second storage electrode lines;
a plurality of third switching elements connected between the first signal line and the first storage electrode lines and turned on or turned off in response to the gate signal; and
a plurality of fourth switching elements connected between the second signal line and the second storage electrode lines and turned on or turned off in response to the gate signal.

7. The liquid crystal display of claim 1, wherein the first and second liquid crystal capacitors include a first and a second sub-pixel electrode and a common electrode, and each of the first and second sub-pixel electrodes includes at least two parallelogrammic electrode pieces of which inclination directions are different from each other.

8. The liquid crystal display of claim 7, wherein an area of the second sub-pixel electrode is greater than an area of the first sub-pixel electrode.

9. The liquid crystal display of claim 1, wherein the second terminal of the third storage capacitor of each alternating pixel is supplied with the first storage electrode signal and the second terminal of the third storage capacitor of each pixel adjacent to each alternating pixel is supplied with the second storage electrode signal.

10. The liquid crystal display of claim 1, wherein a luminance of a first sub-pixel of each pixel including the third storage capacitor and the first liquid crystal capacitor is greater than a luminance of a second sub-pixel of each pixel including the first and second storage capacitors and the second liquid crystal capacitor.

11. A liquid crystal display comprising: a substrate; a gate line formed on the substrate; a data line intersecting the gate line; a first and a second storage electrode line formed on the substrate, the first storage electrode line separated from and not connected to the second storage electrode line; a first and a second thin film transistor, each of which includes a gate electrode connected to the gate line, a source electrode connected to the data line, and a drain electrode; a first sub-pixel electrode connected to the drain electrode of the first thin film transistor; and a second sub-pixel electrode connected to the drain electrode of the second thin film transistor and forming a pixel electrode along with the first sub-pixel electrode, wherein the second sub-pixel electrode or the drain electrode of the second thin film transistor overlaps the first and second storage electrode lines, and the first sub-pixel electrode or the drain electrode of the first thin film transistor overlaps either the first or the second storage electrode line, wherein phases of signals applied to the first storage electrode line and the second storage electrode line are opposite to each other.

12. The liquid crystal display of claim 11, wherein an area of the first sub-pixel electrode is smaller than an area of the second sub-pixel electrode.

13. The liquid crystal display of claim 12, wherein each of the first and second sub-pixel electrodes includes at least two parallelogrammic electrode pieces of which inclination directions are different from each other.

14. The liquid crystal display of claim 11, wherein the first and second storage electrode lines are disposed between the first sub-pixel electrode and the second sub-pixel electrode.

15. The liquid crystal display of claim 11, wherein the data line extends in a straight line.

16. The liquid crystal display of claim 15, further comprising an organic layer formed between the first and second thin film transistors, the gate line, and the data line and the pixel electrode.

17. A driving method of a liquid crystal display including a plurality of pixels, each of the pixels comprising: a gate line; a data line; a first and a second storage electrode line; a first and a second switching element connected to the gate line and the data line; a first liquid crystal capacitor connected to the first switching element; a second liquid crystal capacitor connected to the second switching element; a first storage capacitor connected to the first switching element and the first or the second storage electrode line; a second storage capacitor connected to the second switching element and the first storage electrode line; and a third storage capacitor connected to the second switching element and the second storage electrode line, the method comprising:
applying different signals to the first storage electrode line and the second storage electrode line;
charging the first and second liquid crystal capacitors, and raising or dropping a voltage of the first liquid crystal capacitor by raising a voltage of the first storage electrode line or dropping a voltage of the second storage electrode line,
wherein
the first storage electrode line is separated from the second storage electrode line.

18. The driving method of claim 17, wherein charging the first and second liquid crystal capacitors comprises:
applying a data voltage to the data line;
transmitting the data voltage to the first and second liquid crystal capacitors by applying a first voltage to the gate line to turn on the first and second switching elements; and
turning off the first and second switching elements by applying a second voltage to the gate line.

19. The driving method of claim 17, wherein raising or dropping a voltage of the first liquid crystal capacitor comprises applying signals having opposite phases to each other to the first storage electrode line and the second storage electrode line, respectively.

20. The driving method of claim 17, wherein the liquid crystal display includes a plurality of first gate lines and a plurality of second gate lines arranged alternately with the first gate lines, and charging the first and second liquid crystal capacitors comprises:
- charging first and second liquid crystal capacitors connected to the first gate lines; and
- charging first and second liquid crystal capacitors connected to the second gate lines, and raising or dropping a voltage of the first liquid crystal capacitor comprises:
- varying voltages of the first storage electrode line and the second storage electrode line after applying a first voltage to the first gate lines and before sequentially applying the first voltage to the second gate lines; and
- varying voltages of the first storage electrode line and the second storage electrode line after applying the first voltage to the second gate lines.

21. The driving method of claim 17, wherein raising or dropping a voltage of the first liquid crystal capacitor includes adjusting the voltage of the first liquid crystal capacitor such that a lateral gamma curve of the liquid crystal display becomes similar to a frontal gamma curve of the liquid crystal display to improve lateral visibility.

* * * * *